United States Patent
Shraga et al.

(10) Patent No.: US 7,946,372 B2
(45) Date of Patent: May 24, 2011

(54) DUAL TRACKED MOBILE ROBOT FOR MOTION IN ROUGH TERRAIN

(75) Inventors: Shoval Shraga, Moshav Ein Eron (IL); Amir Shapiro, Metar (IL)

(73) Assignee: Ariel—University Research and Development Company Ltd.,, Ariel (IL)

( * ) Notice: Subject to any disclaimer, the term of this patent is extended or adjusted under 35 U.S.C. 154(b) by 150 days.

(21) Appl. No.: 12/094,358

(22) PCT Filed: Nov. 20, 2006

(86) PCT No.: PCT/IL2006/001332
§ 371 (c)(1),
(2), (4) Date: Nov. 11, 2008

(87) PCT Pub. No.: WO2007/057904
PCT Pub. Date: May 24, 2007

(65) Prior Publication Data
US 2009/0211823 A1    Aug. 27, 2009

(30) Foreign Application Priority Data
Nov. 21, 2005   (IL) .......................................... 172078

(51) Int. Cl.
*B62D 1/24*   (2006.01)
*B62D 55/065*   (2006.01)
(52) U.S. Cl. ..... 180/197; 180/9.42; 180/9.32; 180/14.1; 180/14.2
(58) Field of Classification Search ................... 180/4.9, 180/9.42, 9.32, 14.1, 14.2, 167
See application file for complete search history.

(56) References Cited

U.S. PATENT DOCUMENTS

| | | | | |
|---|---|---|---|---|
| 1,515,756 A * | 11/1924 | Roy | ............................... | 280/474 |
| 3,845,832 A * | 11/1974 | Glover | ......................... | 180/14.1 |
| 4,403,670 A * | 9/1983 | Sammarco | .................... | 180/14.1 |
| 4,645,023 A * | 2/1987 | Rea et al. | ..................... | 180/9.32 |
| 4,735,432 A * | 4/1988 | Brown | ......................... | 280/404 |
| 4,909,341 A * | 3/1990 | Rippingale et al. | ............ | 180/9.1 |
| 5,363,935 A * | 11/1994 | Schempf et al. | ............... | 180/9.1 |
| 5,725,230 A * | 3/1998 | Walkup | ......................... | 280/442 |
| 6,523,629 B1 | 2/2003 | Buttz et al. | | |
| 6,837,318 B1 * | 1/2005 | Craig et al. | .................... | 180/6.7 |
| 7,654,551 B2 * | 2/2010 | Page | .......................... | 280/416.1 |
| 2004/0226760 A1 | 11/2004 | Loh et al. | | |

OTHER PUBLICATIONS

Shoval Shraga: "Stability of a multi tracked robot traveling over steep slopes"; Proceedings of the Int'l Conf. of Robotics and Automation, Apr. 26, 2004, XP002425893, USA.

(Continued)

*Primary Examiner* — Paul N Dickson
*Assistant Examiner* — Marlon A Arce
(74) *Attorney, Agent, or Firm* — Alston & Bird LLP

(57) ABSTRACT

The invention is an autonomous dual tracked mobile (10) robot system comprising two or more tracked driving units (12x) configured to travel in tandem and a separate mechanical linkage (16), which joins each of the mobile units to the unit immediately preceding and following it, and enables efficient power transmission between the two driving units. Each of the mechanical linkages comprises one connecting bar (14) and three revolute joints (18y) located on each of the adjacent units and a connecting beam that connects the connecting bar on one of the units with the connecting bar on the adjacent unit.

10 Claims, 9 Drawing Sheets

OTHER PUBLICATIONS

Althoefer K. et al., "Monitoring of Self-Tapping . . . Networks", Transactions of the ASME: J. of Manufacturing Science and Engineering, vol. 127, Issue 1, pp. 236-243, Feb. 2005.

Shiller, Z., and Serate, W., "Trajectory Planning of Tracked Vehicles," ASME Journal of Dynamic Systems, Measurement and Control, Dec. 1995, vol. 117, No. 4, pp. 619-624.

Tan C., Zweiri H. Y, Althoefer K., Seneviratne D. L.: "On-Line Soil Property Estimation for Autonmous Excavator Vehicles". ICRA 2003: pp. 121-126.

Yoshida K., Hamano H., "Motion Dynamics of a Rover with Slip-Based Traction Model", International Conference on Robotics and Automation, 2002, pp. 3155-3160.

* cited by examiner

DUAL TRACKED MOBILE ROBOT FOR MOTION IN ROUGH TERRAIN

FIELD OF THE INVENTION

The invention is from the field of mobile robotics. Specifically the field of the invention is unmanned tracked vehicles. More specifically the invention relates to dual tracked mobile systems for autonomous mobile robots designed for motion on rough terrains.

BACKGROUND OF THE INVENTION

Non-patent publications and other reference materials referred to herein, including reference cited therein, are incorporated herein by reference in their entirety and are referenced in the following text and respectively grouped in the appended Bibliography which immediately precedes the claims.

Unmanned Ground Vehicles (UGVs) are being used in various applications, including space explorations, military missions, agriculture, and subterranean missions. Off road vehicles have been investigated for a long time, both for wheeled and tracked vehicles. While wheels are efficient for motion on relatively smooth and flat surfaces, tracked vehicles offer several advantages for motion on rough terrains. However, autonomous unmanned tracked vehicles introduce some drawbacks that limit their use. In particular, positioning and motion control for tracked vehicles are complex due to the nature of the slip during skid-steering. Some models for slip estimation have been developed (Yoshida, 2001, Shiller and Serate, 1995), but they require sufficient data on the surface traversed by the vehicle.

Some systems improve performance and autonomy of the UGV by acquiring information from the terrain through identifying soil parameters using physical models and numerical techniques. Among other researchers, Tan et. al. (2003) use on-line identification systems to estimate friction coefficients in excavation missions.

It has been recognized that one way to overcome some of the difficulties encountered in traversing rough terrain using tracked robotic vehicles is to operate two or more of the vehicles in tandem. Advantages of operating in this manner include providing a wider effective wheel base to prevent the vehicle from overturning and that the vehicles can help each other overcome obstacles such as steep up or down slopes by employing a push-pull effect. Such an arrangement is described in U.S. Pat. No. 6,523,629. Coupling between the two robots is by means of two mating elements one mounted at the center of the back of the platform of the leading robot and the second at the center of the front of the trailing robot. Two configurations for the coupling device are described. A ball and socket configuration, which allows a maximum angular motion between the two robot platforms, and a ball and socket configuration, which permits vertical motion but not horizontal motion. The coupling device can either be passive or active. In the active mode, the coupling device is actuated by gears driven by a gear motor. The coupling between the two robots has several drawbacks including:

In either the passive or active mode there is no relative lateral motion between the two tanks and the angular motion of one robot is constrained by the other robot, resulting in restricted maneuverability while engaged.
  No mechanism exists for relative configuration measurements between the two robots; therefore, that the accuracy of the whole system is limited.

It is a purpose of this invention to provide unmanned tracked vehicles which overcome some of the drawbacks of the prior art.

It is another purpose of the invention to provide a mechanical linkage between two tracked driving units that allows improved mobility, accuracy and efficiency of autonomous robotic missions.

It is a further purpose of the invention to provide unmanned tracked vehicles capable of effectively performing autonomous robotic missions in unknown environments, particularly in confined spaces such as tunnels and pipes.

Further purposes and advantages of this invention will appear as the description proceeds.

SUMMARY OF THE INVENTION

The invention is an autonomous dual tracked mobile robot system comprising two or more tracked driving units configured to travel in tandem and a separate mechanical linkage joining each of the mobile units to the unit immediately preceding and following it. Each of the mechanical linkages enables efficient power transmission between the two driving units and comprises:

one connecting bar and three revolute joints on each of the units; and
  a connecting beam that connects the connecting bar on one of the units with the connecting bar on the adjacent unit.

In the preferred embodiment, there are incremental encoders attached to each revolute joint, thereby allowing measurements of the relative configuration of the components of the system. One of the revolute joints on each unit connects the bottom of the connecting bar to the top of the unit allowing unlimited revolution of the connecting bar around an axis perpendicular to the upper surface of the unit and the other two revolute joints have limited motion bounded by the mechanical design of the joint and adjustable by using two screws provided for this purpose on each joint.

Each driving unit comprises a rechargeable power supply, which supplies energy to the electric motors that drive the tracks on the unit and to other onboard equipment. Two-way communication with the autonomous robot system can be wireless or by means of an electric cable or a fiber optic cable. When the communication is by means of a cable the robot system comprises a winch system mounted on one of the driving units for transporting, releasing, and rewinding the cable.

In a preferred embodiment the autonomous dual tracked mobile robot system of the invention is controlled by a synchronous motion controller that performs low level motor control of each track, the low level controller being connected to a higher level controller, which synchronizes the two units according to data from the connecting beam. Preferably, the autonomous dual tracked mobile robot system comprises a control system comprised of control software and a control screen viewed by the operator, the control system displaying one or more of the following:

the various operation modes;
  internal data, i.e. encoder data and winch status;
  an aerial photo of the robot area with an overlaying graph of the robot's trajectory and current position;
  a video images from on-board cameras;
  additional sensory data, which can be presented using special commands; and
  a graphic window showing a three dimensional scheme of the relative position of the two units.

For an embodiment of the autonomous dual tracked mobile robot system comprising two driving units there is provided a dual joystick, which, together with the control software, provides the user with the following options to control the two units: single mode; twin mode; follow mode 1; and follow mode 2.

Each driving unit of the autonomous dual tracked mobile robot system of the invention can be equipped with one or more of the following: on-board motion controller; fiber-optics system; camera; lights; and additional sensors of various types.

The autonomous dual tracked mobile robot system of the invention can be designed and equipped to be completely autonomous such that it doesn't have a communication channel and can travel without an operator's intervention.

All the above and other characteristics and advantages of the invention will be further understood through the following illustrative and non-limitative description of preferred embodiments thereof, with reference to the appended drawings.

DETAILED DESCRIPTION OF PREFERRED EMBODIMENTS

The present invention overcomes some of the drawbacks of unmanned tracked vehicles by using a unique, dual-tracked mobile-platform design and control system. The dual tracked mobile system consists of new kinematics for an autonomous mobile robot designed for motion on rough terrains that conventional vehicles cannot tolerate. The robot improves mobility, accuracy and efficiency of autonomous robotic missions in unknown environments, particularly in confined spaces such as tunnels and pipes.

The mechanical design of the robot of the invention is based on a parallel mechanism in which an upper beam is connected to two tracked driving units with two connecting bars using six revolute joints. The controlled motion of the driving units accurately and reliably determines the position and orientation of the whole system, while providing excellent mobility and rigidity. A schematic description of the system is shown in FIG. 1.

Figure 1:
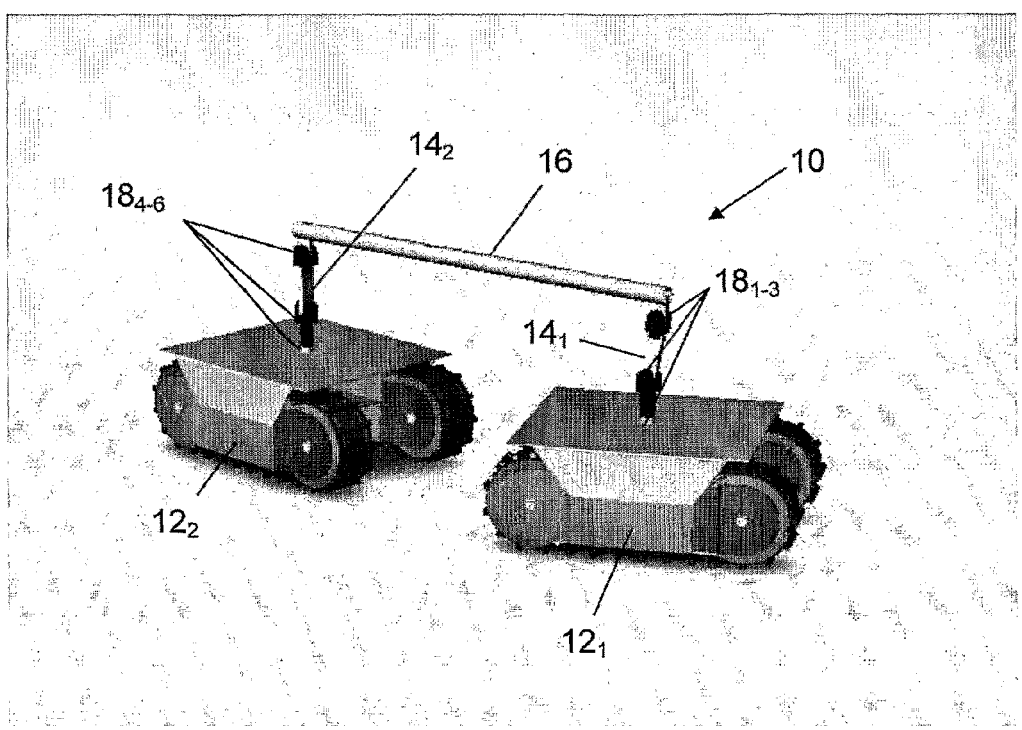
FIG. 1 schematically shows the system of the invention.

In FIG. 1 can be seen the robot of the invention. Robot 10 is comprised of two tracked driving units $12_1$ and $12_2$. The major innovative feature of the mobile system of the invention is in the mechanical linkage used to join the two driving units. The linkage comprises a connecting beam 16, two connecting bars $14_1$ and $14_2$, and six revolute joints $18_1$ to $18_6$. As will be described herein below the mechanical linkage of the invention has many advantages over those of the prior art, e.g. allows the spatial distance and orientation between the tracked units to vary for motion in various terrains; encoders provided on the linkage allow advanced position estimates with minimal errors, thereby improving accuracy and reliability; each driving unit can perform independent angular motion when in tight engagement and independent lateral and angular motion in "loose" engagement; allows selection of various internal configurations between the driving units, thereby insuring that force and moments are transmitted in the selected direction, The linkage is shown in schematically FIG. 2. The six revolute joints provide relative motion between the two tracked driving units. These relative motions are measured, using incremental encoders attached to each joint. The following table provides the details of each joint. The table refers to rotation angles θ about rotational axis U, where $U_1$, $U_2$, and $U_3$ are attached to one tracked unit ($12_1$ in FIG. 1) and $U_4$, $U_5$ and $U_6$ are attached to the other tracked unit ($12_2$ in FIG. 1).

| Joint | Measured angle | Description |
| --- | --- | --- |
| 1 | $\theta_1$ | Measures rotation around $U_1$ between $12_1$ and $14_1$ |
| 2 | $\theta_2$ | Measures rotation around $U_2$ between $14_1$ and 16 |
| 3 | $\theta_3$ | Measures rotation around $U_3$ between $12_1$ and $14_1$ |
| 4 | $\theta_4$ | Measures rotation around $U_4$ between $12_2$ and $14_2$ |
| 5 | $\theta_5$ | Measures rotation around $U_5$ between $14_2$ and 16 |
| 6 | $\theta_6$ | Measures rotation around $U_6$ between $12_2$ and $14_2$ |

Figure 3A:
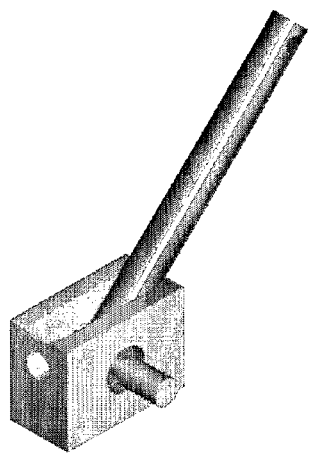
FIG. 3 shows the limited motion of some of the revolute joints.
Figure 3B:
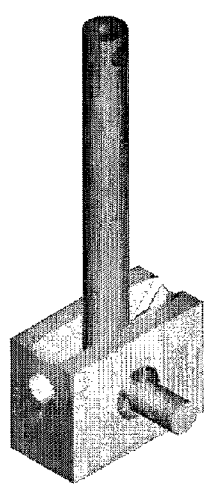
Figure 3C:
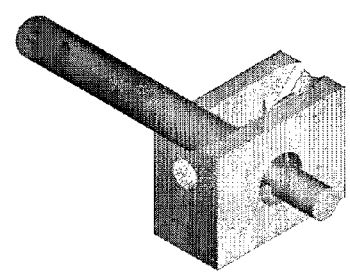

Joints $18_1$ and $18_4$ allow unlimited revolution around their corresponding axis ($U_1$ and $U_4$). The other joints have limited motion as shown in FIG. 3. The limited motion is bounded by the mechanical design of the joint, and can be adjusted using two screws attached at each side of the joint. The figure shows three possible configurations of the joints. In (b), the joint is within the motion limits, and is therefore free to move around its revolute axis. In (a) and (c), the joint has reached the limit of its motion and further movement is possible only in one direction (CCW in (a), and CW in (c)). Inserting screws on the side walls of the joint allows the mobility of the joint to be adjusted.

Figure 2:
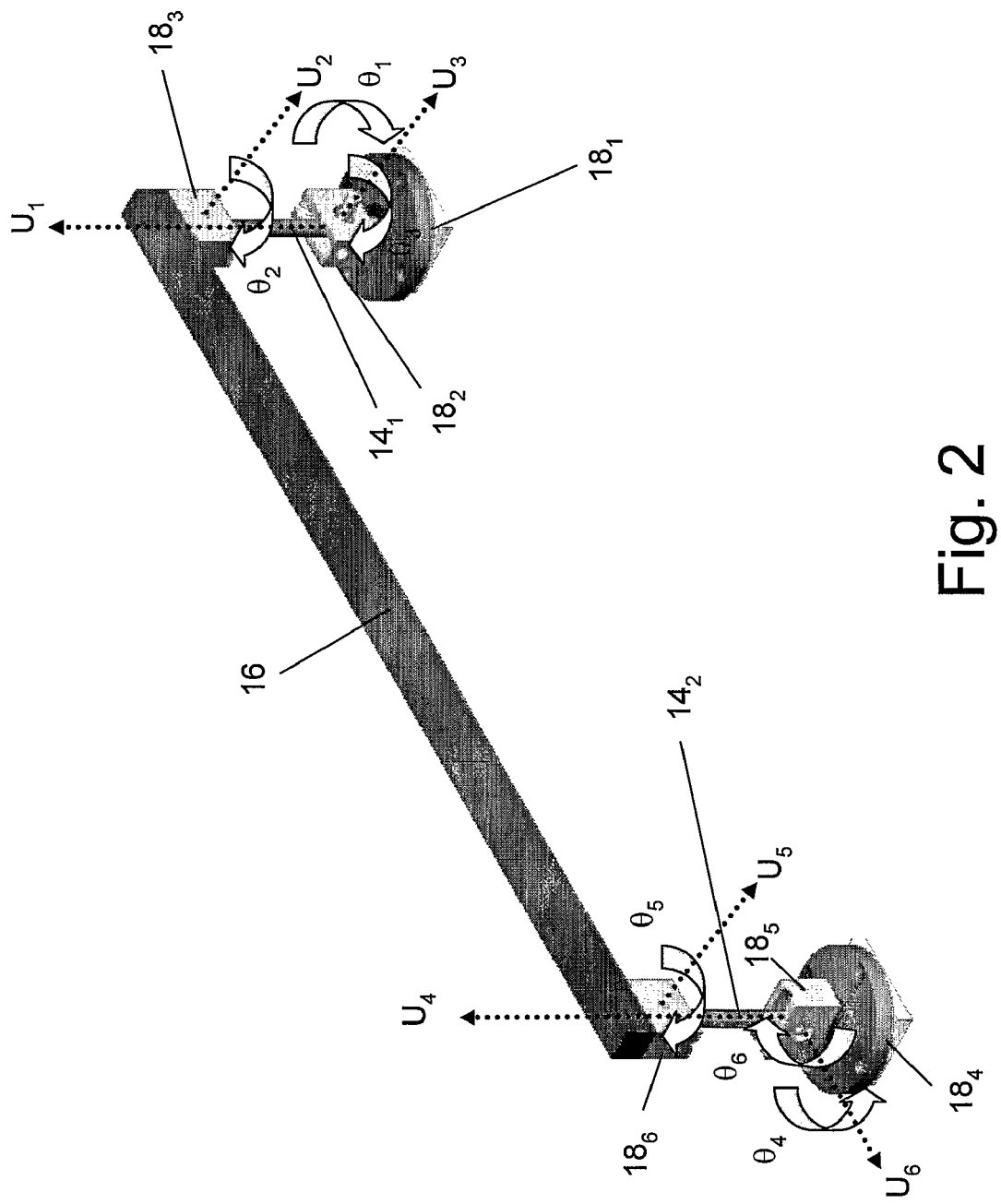
FIG. 2 schematically shows the linkage mechanism of the system of the invention.

This configuration shown in FIG. 1 and FIG. 2 allows each tracked unit to move freely regardless of the motion of the other unit as long as all joints are within the limits of their motion. However, when one or more of the joints reach their limits, the motion of one tracked unit is limited by the other unit. In this case, forces and moments are transferred by the connecting beam 16, such that one tracked unit can apply forces and moments on the other unit.

Figure 4A:
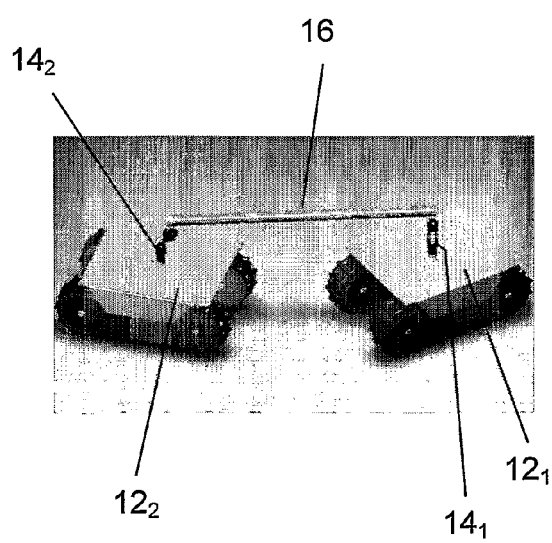
FIG. 4A and FIG. 4B show two configurations in which the joints reach their limits and transfer forces from one unit to the other.
Figure 4B:
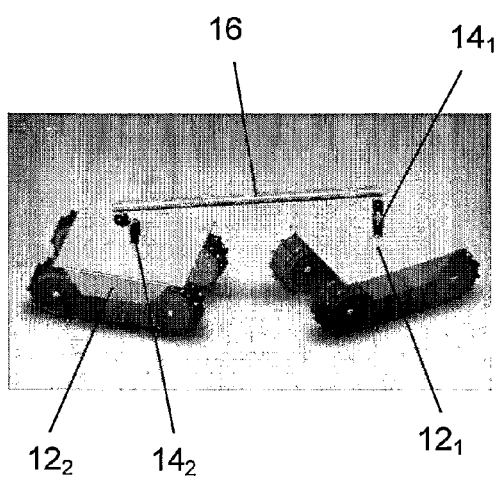

FIG. 4A and FIG. 4B show two configurations in which the joints reach their limits and transfer forces from one unit to the other. FIG. 4A shows the configuration in which unit $12_2$ pulls unit $12_1$ to the left. FIG. 4(b), shows a configuration in which the unit $12_2$ pushes unit $12_1$ to the right.

Each driving unit is powered by a rechargeable battery which supplies energy to the two electric motors that separately drive the tracks on each tracked driving unit and to the onboard equipment. Two-way communication with the autonomous robot system can be wireless; however, for motion in confined spaces where wireless communication is not allowed or possible, a direct link between the operator and the robot is required. An electric cable can be used; however, in many situations pulling a cable is impractical due to the weight of the cable and the friction that may develop when turning several times along the path. To overcome this problem, the preferred embodiment of the system is equipped with a winch that carries a fiber-optic cable and transmitters/receivers for converting from electrical to optical signals and vice versa. The winch synchronizes the amount of optic fiber released during forward motion, and rewinds it (rolls the cable back) during reverse motion. It is located on the rear tracked unit, and is synchronized with the motion of that unit. In the prototype system described hereinbelow the winch is designed for optical fibers 300 m long, but can be modified for 600 m long fibers or even longer, depending on the diameter and weight of the cable.

Controlling the robot is performed by a synchronous motion controller that performs the low level motor control of each track. The controller is connected to a higher level controller (currently implemented on a laptop computer) which synchronizes the two units according to data from the encoders mounted on the connecting beam. Given the mission and the updated configuration of the system, the computer generates the required trajectory of each tracked unit, monitors the performance of the system, and if required, updates commands to the motion controller.

Figure 5:
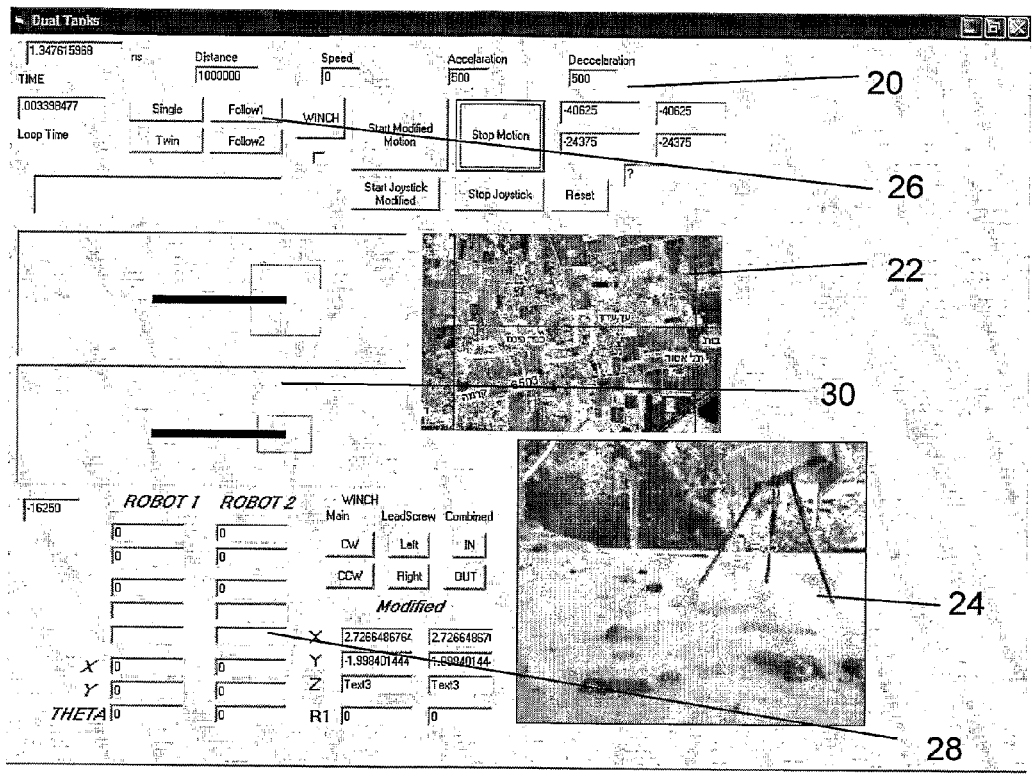
FIG. 5 shows the control screen viewed by the operator.

The control system is written in a higher programming language allowing several operation modes. The control screen viewed by the operator is shown in FIG. 5. The control software displays the various operation modes, internal data (encoder data and winch status) 20, an aerial photo of the robot area and an overlaying graph of the robot's trajectory and current position 22, and a video image from the on-board camera 24. The operator selects the operation mode 26 using the joystick buttons. Additional data 28 can be presented using special commands. A graphic window shows a three dimensional scheme of the relative position of the two platforms 30.

The system is equipped with a dual joystick, which, together with the control software, provides the user with several options to control the two units:

1) Single mode—in this mode the operator can control each tracked unit independently using the two joystick handles. This mode is useful when the two units are visible to the operator, and for motion on difficult terrain where one unit assists the other to overcome obstacles along the path. In this operation mode the connecting beam is particularly useful as it can transfer power between the two tracked units according the relative configuration between the driving units.

2) Twin mode—In this mode the two tracked units perform identical motion according to data from a single handle of the joystick. This mode is efficient when the whole system is used as a single mobile robot, and when changes in the internal configurations of the units are not required.

3) Follow mode 1—Similar to the twin mode, the operator uses a single handle of the joystick, but in this mode the back unit follows the front unit. This mode is useful for motion in long and confined spaces such as tunnels and tubes where the width of free passage is limited. This mode is similar to driving a semi-trailer truck in which the front unit leads the rear unit. In terms of operational requirements and skills, it is easier as the operator is required to control the front unit only, while the control system determines the required motion of the rear tracked unit.

4) Follow mode 2—In this mode the operator controls the system using a single handle, similar to the follow mode 1. However, here the rear unit follows the front unit such that it aligns itself with the connecting bar. This mode is useful when such an alignment is essential for a successful mission. For example, this mode guarantees that the camera on the rear unit always follows the front unit. Another application that can benefit from this mode is for full power transmission from the rear unit to the front, along the longitudinal direction.

Encoders are attached to each joint, providing sufficient data to accurately determine the position of each joint. Based on this data, a 3D model provides better accuracy than a conventional odometric system. The position of each driving unit relative to the other is performed using a conventional forward kinematics model. The following is the basic forward kinematics model which determines the position of unit #2 relative to unit #1:

$$T_0^1 = \begin{bmatrix} \cos\theta_1 & -\sin\theta_1 & 0 & l_1 \\ \sin\theta_1 & \cos\theta_1 & 0 & 0 \\ 0 & 0 & 1 & 0 \\ 0 & 0 & 0 & 1 \end{bmatrix}$$

$$T_1^2 = \begin{bmatrix} \cos\theta_2 & 0 & \sin\theta_2 & 0 \\ 0 & 1 & 0 & 0 \\ -\sin\theta_2 & 0 & \cos\theta_2 & a \\ 0 & 0 & 0 & 1 \end{bmatrix}$$

$$T_2^3 = \begin{bmatrix} \cos\theta_3 & 0 & \sin\theta_3 & 0 \\ 0 & 1 & 0 & 0 \\ -\sin\theta_3 & 0 & \cos\theta_3 & b \\ 0 & 0 & 0 & 1 \end{bmatrix}$$

$$T_3^4 = \begin{bmatrix} \cos\theta_4 & 0 & \sin\theta_4 & L \\ 0 & 1 & 0 & 0 \\ -\sin\theta_4 & 0 & \cos\theta_4 & 0 \\ 0 & 0 & 0 & 1 \end{bmatrix}$$

$$T_4^5 = \begin{bmatrix} 1 & 0 & 0 & 0 \\ 0 & \cos\theta_5 & -\sin\theta_5 & 0 \\ 0 & \sin\theta_5 & \cos\theta_5 & -b \\ 0 & 0 & 0 & 1 \end{bmatrix}$$

$$T_5^6 = \begin{bmatrix} \cos\theta_6 & -\sin\theta_6 & 0 & 0 \\ \sin\theta_6 & \cos\theta_6 & 0 & 0 \\ 0 & 0 & 1 & -a \\ 0 & 0 & 0 & 1 \end{bmatrix}$$

$$T_6^7 = \begin{bmatrix} 1 & 0 & 0 & l_2 \\ 0 & 1 & 0 & 0 \\ 0 & 0 & 1 & 0 \\ 0 & 0 & 0 & 1 \end{bmatrix}$$

$$T_0^7 = T_0^1 T_1^2 T_2^3 T_3^4 T_4^5 T_5^6 T_6^7 = \begin{bmatrix} R_0^7 & d_0^7 \\ 0\ 0\ 0 & 1 \end{bmatrix}$$

where:
$l_1$ and $l_2$—offsets of the rotation center of driving units #1 and #2 relative to their geometric center
a—distance between revolute joint #1 and revolute joint #6 to the geometric center of driving unit #1 and driving unit #2 respectively
b—length of the connecting bars (assuming equal lengths for both units)
L—length of the connecting beam
$d_0^7$—position of the geometric center of unit #2 relative to the geometric center of unit #1.
$R_0^7$—orientation of unit #2 relative to unit #1
where:
$R_0^7(1,1) = -\cos[\theta_5]\sin[\theta_1]\sin[\theta_6] + \cos[\theta_1](\cos[\theta_2+\theta_3+\theta_4]\cos[\theta_6] + \sin[\theta_2+\theta_3+\theta_4]\sin[\theta_5]\sin[\theta_6])$
$R_0^7(1,2) = -\cos[\theta_5]\cos[\theta_6]\sin[\theta_1] + \cos[\theta_1](\cos[\theta_6]\sin[\theta_2+\theta_3+\theta_4]\sin[\theta_5] - \cos[\theta_2+\theta_3+\theta_4]\sin[\theta_6])$ $R_0^7(1,3)$=Cos [θ$_1$] Cos [θ$_5$] Sin [θ$_2$+θ$_3$+θ$_4$]+Sin [θ$_1$] Sin [θ$_5$]
$R_0^7(2,1)$=Cos [θ$_2$+θ$_3$+θ$_4$] Cos [θ$_6$] Sin [θ$_1$]+(Cos [θ$_1$] Cos [θ$_5$]+Sin [θ$_1$] Sin [θ$_2$+θ$_3$+θ$_4$] Sin [θ$_5$]) Sin [θ$_6$]
$R_0^7(2,2)$=Cos [θ$_1$] Cos [θ$_5$] Cos [θ$_6$]+Sin [θ$_1$] (Cos [θ$_6$] Sin [θ$_2$+θ$_3$+θ$_4$] Sin [θ$_5$]−Cos [θ$_2$+θ$_3$+θ$_4$] Sin [θ$_6$])
$R_0^7(2,3)$=Cos [θ$_5$] Sin [θ$_1$] Sin [θ$_2$+θ$_3$+θ$_4$]−Cos [θ$_1$] Sin [θ$_5$]
$R_0^7(3,1)$=−Cos [θ$_6$] Sin [θ$_2$+θ$_3$+θ$_4$]+Cos [θ$_2$+θ$_3$+θ$_4$] Sin [θ$_5$] Sin [θ$_6$]
$R_0^7(3,2)$=Cos [θ$_2$+θ$_3$+θ$_4$] Cos [θ$_6$] Sin [θ$_5$]+Sin [θ$_2$+θ$_3$+θ$_4$] Sin [θ$_6$]
$R_0^7(3,2)$=Cos [θ$_2$+θ$_3$+θ$_4$] Cos [θ$_5$]
$d_0^7(1)$=L0−Sin [θ$_1$] (a Sin [θ$_5$]+L1 Cos [θ$_5$] Sin [θ$_6$])+Cos [θ$_1$] (L Cos [θ$_2$+θ$_3$]+L1 Cos [θ$_2$+θ$_3$+θ$_4$] Cos [θ$_6$]+b Sin [θ$_2$]−Sin [θ$_2$+θ$_3$+θ$_4$] (b+a Cos [θ$_5$]−L1 Sin [θ$_5$] Sin [θ$_6$]))
$d_0^7(2)$=L Cos [θ$_2$+θ$_3$] Sin [θ$_1$]+L1 Cos [θ$_2$+θ$_3$+θ$_4$] Cos [θ$_6$] Sin [θ$_1$]+b Sin [θ$_1$] Sin [θ$_2$]−b Sin [θ$_1$] Sin [θ$_2$+θ$_3$+θ$_4$]−a Cos [θ$_5$] Sin [θ$_1$] Sin [θ$_2$+θ$_3$+θ$_4$]+a Cos [θ$_1$] Sin [θ$_5$]+L1 (Cos [θ$_1$] Cos [θ$_5$]+Sin [θ$_1$] Sin [θ$_2$+θ$_3$+θ$_4$] Sin [θ$_5$]) Sin [θ$_6$]
$d_0^7(3)$=a+b Cos [θ$_2$]−L Sin [θ$_2$+θ$_3$]−L1 Cos [θ$_6$] Sin [θ$_2$+θ$_3$+θ$_4$]−Cos [θ$_2$+θ$_3$+θ$_4$] (b+a Cos [θ$_5$]−L1 Sin [θ$_5$] Sin [θ$_6$])

To calculate the position of unit #1 relative to unit #2 a similar model is used, resulting in the following equations:

$$T_7^0 = \begin{bmatrix} R_7^0 & \vec{d}_7^0 \\ 0\ 0\ 0 & 1 \end{bmatrix}$$

Following is the transformation matrix which determines the position of platform #1 relative to platform #2 (all definitions are same as for the previous transformation):
$R_7^0(1,1)$=−Cos [θ$_5$] Sin [θ$_1$] Sin [θ$_6$]+Cos [θ$_1$] (Cos [θ$_2$+θ$_3$+θ$_4$] Cos [θ$_6$]+Sin [θ$_2$+θ$_3$+θ$_4$] Sin [θ$_5$] Sin [θ$_6$])
$R_7^0(1,2)$=Cos [θ$_2$+θ$_3$+θ$_4$] Cos [θ$_6$] Sin [θ$_1$]+(Cos [θ$_1$] Cos [θ$_5$]+Sin [θ$_1$] Sin [θ$_2$+θ$_3$+θ$_4$] Sin [θ$_5$]) Sin [θ$_6$]
$R_7^0(1,3)$=−Cos [θ$_6$] Sin [θ$_2$+θ$_3$+θ$_4$]+Cos [θ$_2$+θ$_3$+θ$_4$] Sin [θ$_5$] Sin [θ$_6$]
$R_7^0(2,1)$=−Cos [θ$_5$] Cos [θ$_6$] Sin [θ$_1$]+Cos [θ$_1$] (Cos [θ$_6$] Sin [θ$_2$+θ$_3$+θ$_4$] Sin [θ$_5$]−Cos [θ$_2$+θ$_3$+θ$_4$] Sin [θ$_6$])
$R_7^0(2,2)$=Cos [θ$_2$] Cos [θ$_5$] Cos [θ$_6$]+Sin [θ$_1$] (Cos [θ$_6$] Sin [θ$_2$+θ$_3$+θ$_4$] Sin [θ$_5$]−Cos [θ$_2$+θ$_3$+θ$_{24}$] Sin [θ$_6$])
$R_7^0(2,3)$=Cos [θ$_2$+θ$_3$+θ$_4$] Cos [θ$_6$] Sin [θ$_5$]+Sin [θ$_2$+θ$_3$+θ$_4$] Sin [θ$_6$]
$R_7^0(3,1)$={Cos [θ$_1$] Cos [θ$_5$] Sin [θ$_2$+θ$_3$+θ$_4$]+Sin [θ$_1$] Sin [θ$_5$]
$R_7^0(3,2)$=Cos [θ$_5$] Sin [θ$_1$] Sin [θ$_2$+θ$_3$+θ$_4$]−Cos [θ$_1$] Sin [θ$_5$]
$R_7^0(3,3)$=Cos [θ$_2$+θ$_3$+θ$_4$] Cos [θ$_5$]
$d_7^0(1)$=−(Cos [t2+t3+t4] Cos [t6] Sin [t1]+(Cos [t1] Cos [t5]+Sin [t1] Sin [t2+t3+t4] Sin [t5]) Sin [t6]) (L Cos [t2+t3] Sin [t1]+L1 Cos [t2+t3+t4] Cos [t6] Sin [t1]+b Sin [t1] Sin [t2]−b Sin [t1] Sin [t2+t3+t4]−a Cos [t5] Sin [t1] Sin [t2+t3+t4]+a Cos [t1] Sin [t5]+L1 (Cos [t1] Cos [t5]+Sin [t1] Sin [t2+t3+t4] Sin [t5]) Sin [t6])−(−Cos [t6] Sin [t2+t3+t4]+Cos [t2+t3+t4] Sin [t5] Sin [t6]) (a+b Cos [t2]−L Sin [t2+t3]−L1 Cos [t6] Sin [t2+t3+t4]−Cos [t2+t3+t4] (b+a Cos [t5]−L1 Sin [t5] Sin [t6]))−(−Cos [t5] Sin [t1] Sin [t6]+Cos [t1] (Cos [t2+t3+t4] Cos [t6]+Sin [t2+t3+t4] Sin [t5] Sin [t6])) (L0−Sin [t1] (a Sin [t5]+L1 Cos [t5] Sin [t6])+Cos [t1] (L Cos [t2+t3]+L1 Cos [t2+t3+t4] Cos [t6]+b Sin [t2]−Sin [t2+t3+t4] (b+a Cos [t5]−L1 Sin [t5] Sin [t6])))}
$d_7^0(2)$=−(L Cos [t2+t3] Sin [t1]+L1 Cos [t2+t3+t4] Cos [t6] Sin [t1]+b Sin [t1] Sin [t2]−b Sin [t1] Sin [t2+t3+t4]−a Cos [t5] Sin [t1] Sin [t2+t3+t4]+a Cos [t1] Sin [t5]+L1 (Cos [t1] Cos [t5]+Sin [t1] Sin [t2+t3+t4] Sin [t5]) Sin [t6]) (Cos [t1] Cos [t5] Cos [t6]+Sin [t1] (Cos [t6] Sin [t2+t3+t4] Sin [t5]−Cos [t2+t3+t4] Sin [t6]))−(Cos [t2+t3+t4] Cos [t6] Sin [t5]+Sin [t2+t3+t4] Sin [t6]) (a+b Cos [t2]−L Sin [t2+t3]−L1 Cos [t6] Sin [t2+t3+t4]−Cos [t2+t3+t4] (b+a Cos [t5]−L1 Sin [t5] Sin [t6]))−(−Cos [t5] Cos [t6] Sin [t1]+Cos [t1] (Cos [t6] Sin [t2+t3+t4] Sin [t5]−Cos [t2+t3+t4] Sin [t6])) (L0−Sin [t1] (a Sin [t5]+L1 Cos [t5] Sin [t6])+Cos [t1] (L Cos [t2+t3]+L1 Cos [t2+t3+t4] Cos [t6]+b Sin [t2]−Sin [t2+t3+t4] (b+a Cos [t5]−L1 Sin [t5] Sin [t6])))}
$d_7^0(3)$=a−0.5 Cos [t5] (−2 b+2 b Cos [t3+t4]+2 a Cos [t2+t3+t4]−L0 Sin [t1−t2−t3−t4]+2 L Sin [t4]+L0 Sin [t1+t2+t3+t4])−L0 Sin [t1] Sin [t5]}

Once the position of each unit is determined relative to the other unit, odometric errors (which can be large in tracked vehicles) can be detected and corrected according the following procedure:

Define $P_{i,j}$ as the relative position of unit i as determined by unit j. For example $P_{1,2}$ is the position (in 3D) of unit #1 as determined by unit #2. $P_{i,i}$ is the position of unit i according to its own position measurement. Each unit determines its own position using a conventional odometric model. As previously mentioned, this position estimate is subject to large errors, mainly due to uncontrolled slippage of the tracks, resulting in unbounded positioning errors. If $P_{i,j}=P_{i,i}$ then the two position estimates are accurate. However, if $P_{i,j} \neq P_{i,i}$ then the odometric model is faulty, and the position of unit i is determined based on the geometric model $P_{i,j}$. This computation is carried out continuously for both platforms. An important assumption is that an odometric error occurs only on one unit at a time. If two odometric errors occur simultaneously, the system cannot detect these errors and the positions of the two units are erroneous. However, since the cycle time of the control system is relatively short (0.02 sec.), the likelihood of simultaneous errors is small as proven by field experiments.

The positioning model is possible due to the number of degrees of freedom (DOF) according to the following analysis:
Number of rigid bodies=7:
0—ground
1—Unit 1
2—Unit 2
3—Vertical beam on unit 1
4—Vertical beam on unit 2
5—Rotating mechanism on unit 1
6—Rotating mechanism on unit 2
7—Connecting beam
Number of joints with 2 DOF—2:
1—between unit 1 and the ground
2—between unit 2 and the ground
Number of joints with 1 DOF—6:
1—between vertical beam and unit 1
2—between vertical beam and unit 2
3—between vertical beam and rotating mechanism unit 1
4—between vertical beam and rotating mechanism unit 2
5—between vertical beam and connecting beam unit 1
6—between vertical beam and connecting beam unit 2

The number of the degrees of freedom of a system in three dimensions is given by the following equation:

$$N_T = 6*(N_B-1) - 4*N_2 - 5*N_1$$

Where
$N_T$—The number of degrees of freedom of the whole system
$N_B$—The number of rigid bodies in the system=7+ground=8
$N_2$—The number of joints with two degrees of freedom=2
$N_1$—The number of joints with one degree of freedom=6

According to this analysis, the total number of DOF of the whole system is 4 (each unit can move forwards-backwards and rotate=2DOF per robot). The geometric model can, therefore, determine the position of one unit based on the position of the other unit and the encoders' data attached the connecting mechanism (total of 6 revolute joints and 6 encoders).

FIG. 6 to FIG. 10B are photographs showing the prototype model of the autonomous mobile robot of the invention. These photographs are provided merely to illustrate the invention and are not intended to limit the scope of the invention in any manner.

Figure 6:
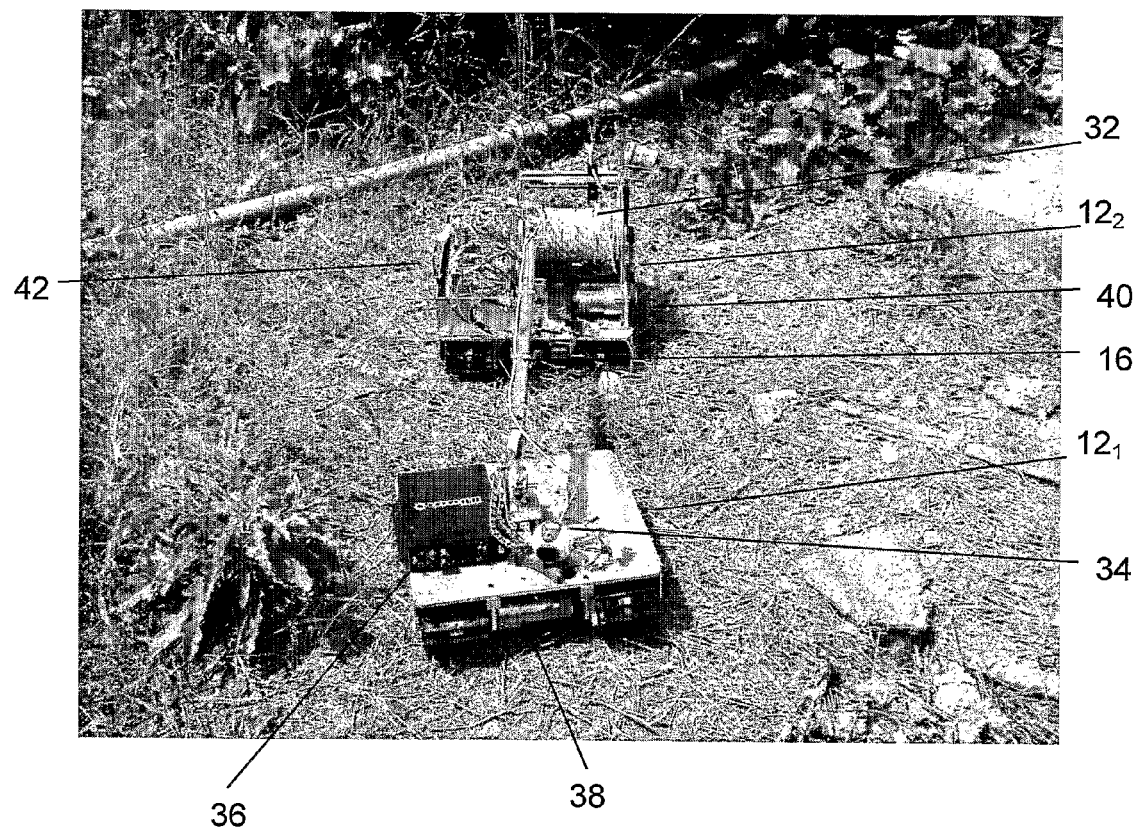
FIG. 6 to FIG. 10B are photographs showing different views of the prototype model of the autonomous mobile robot

FIG. 6 shows the two units $12_1$ and $12_2$ linked by connecting beam 16 moving across a field strewn with rocks and other obstacles. Prominent components of the system that can be seen on the two units are winch 32; camera 34; the transmitter/receiver of the fiber optics system 36, which can transmit/receive data communication as well as two video channels; drive motor 38 for the tracks of the mobile unit, winch motor 40, for rotating the drum of the winch unit to reel-off or reel-on the fiber cable; and the on-board controller 42, for low level motion control.

Figure 7:
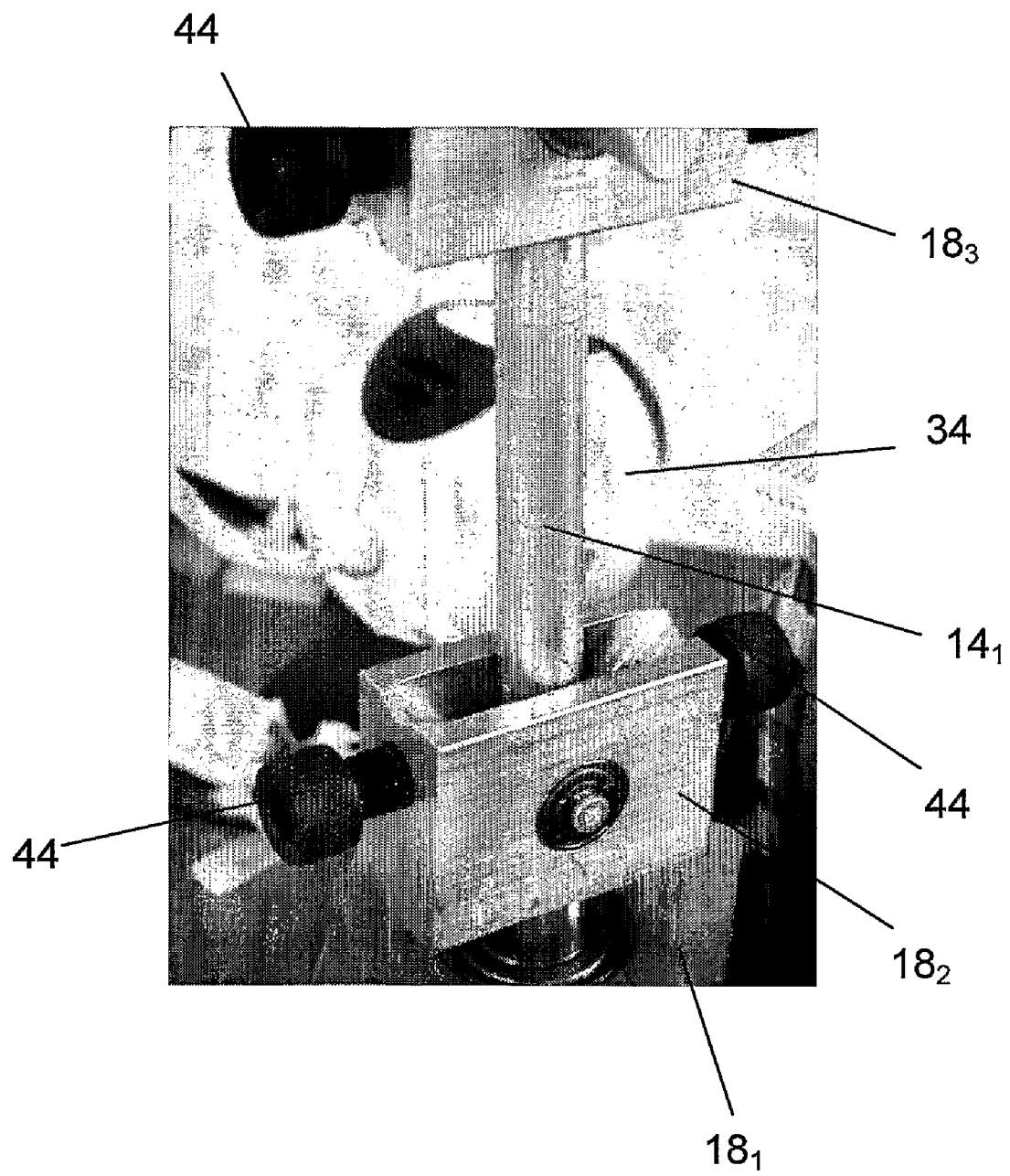

FIG. 7 shows a close-up of the revolute joint module on the first mobile unit. The screws 44 on the side walls of the joints, which allow the mobility of the joint to be adjusted, are seen in this photograph.

Figure 8:
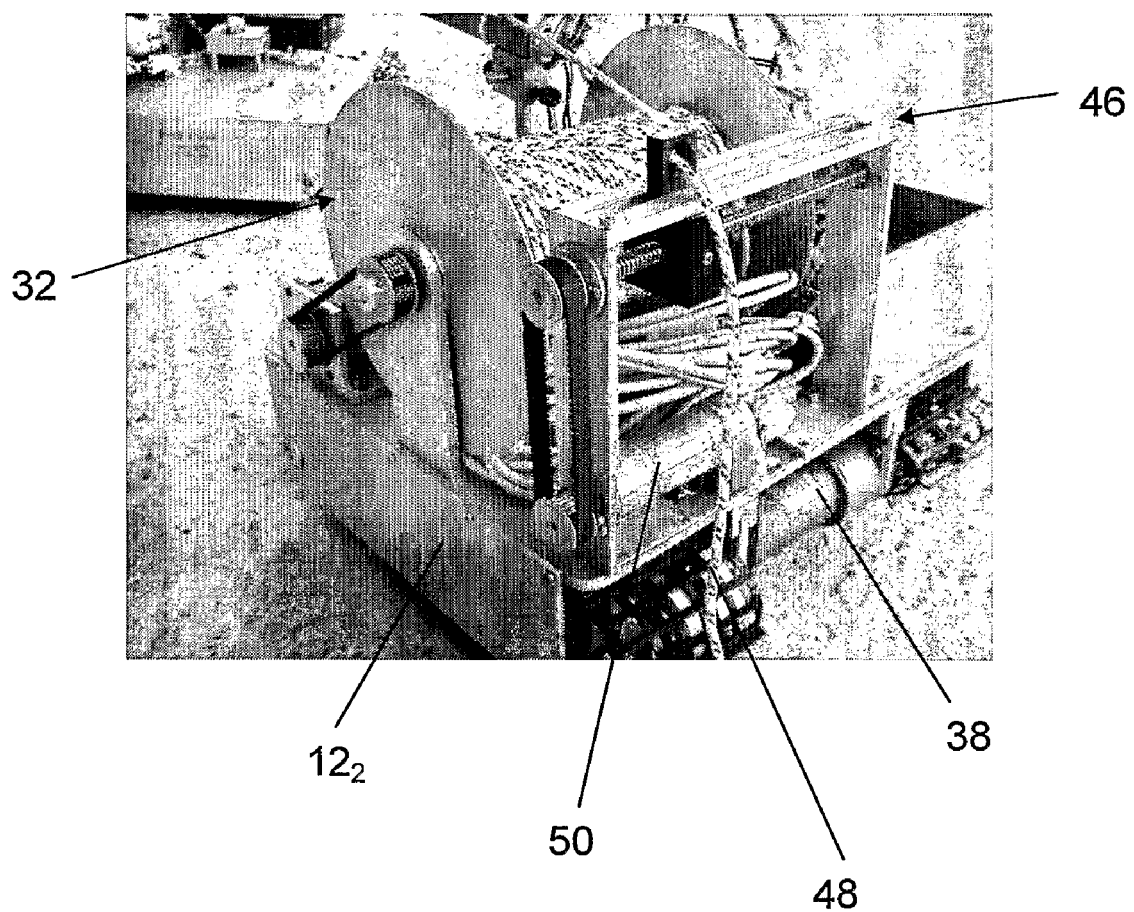

FIG. 8 is a view of the rear of the second unit. This shows the arrangement 46 for reel-off/reel-on of the optical fiber cable 48 from the winch unit 32, including motor 50, which moves the guide for winding the cable evenly onto the drum.

Figure 9:
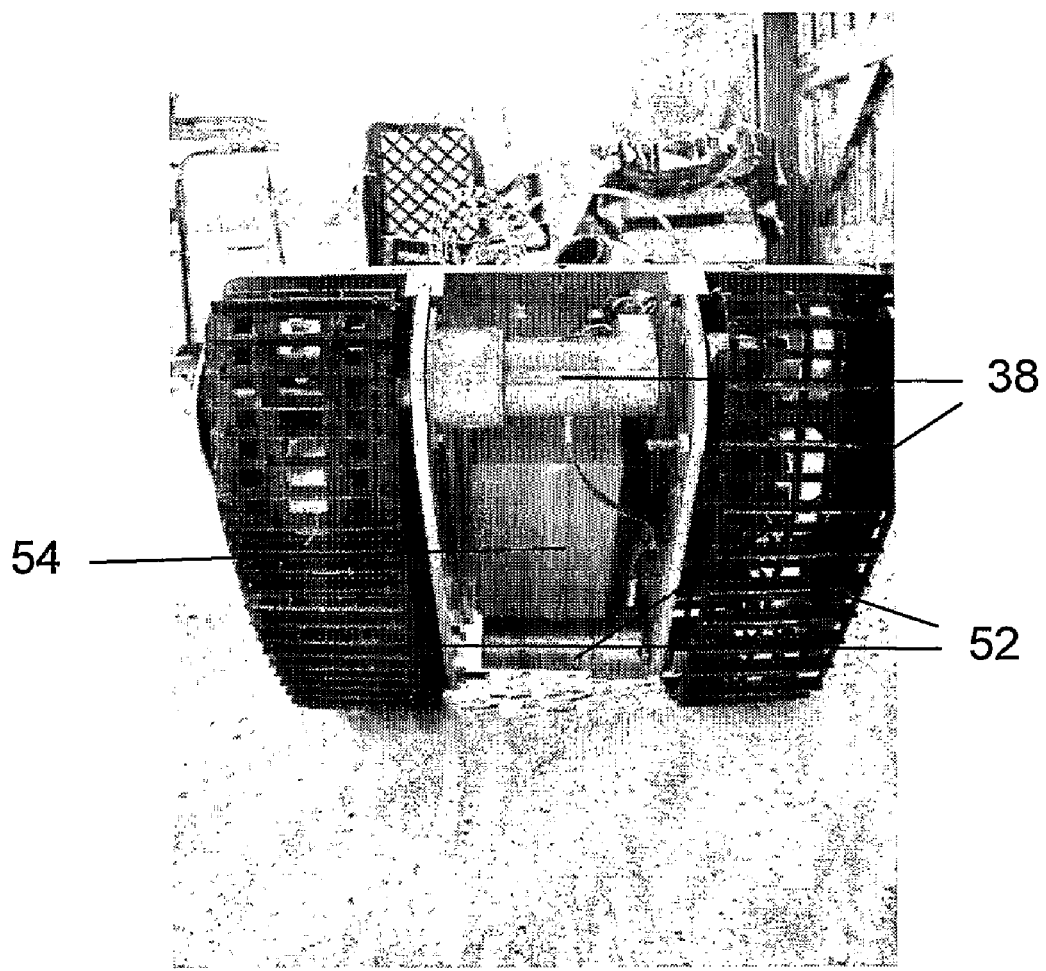

FIG. 9 shows the bottom side of the driving unit. Seen in this photograph are the motors 38 that drive the tracks 52 and the power supply 54. Each driving unit is equipped with one rechargeable power supply 54. The power supplies can be commercial off-the-shelf products. They are located at the position shown in FIG. 9 in order to lower the center of gravity of the driving unit and therefore improve stability. They provide power to the motors, the on-board motion controller, to the fiber-optics system, to other optional devices that may be present on the drive unit, e.g. lights and additional sensors of various types.

Figure 10A:
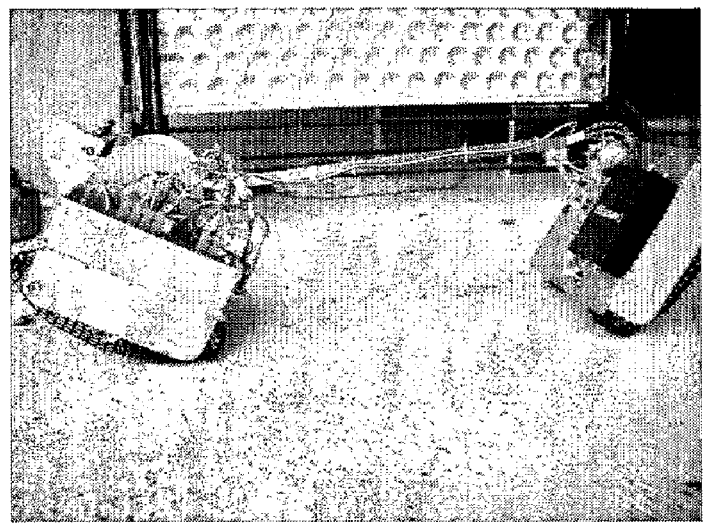
Figure 10B:
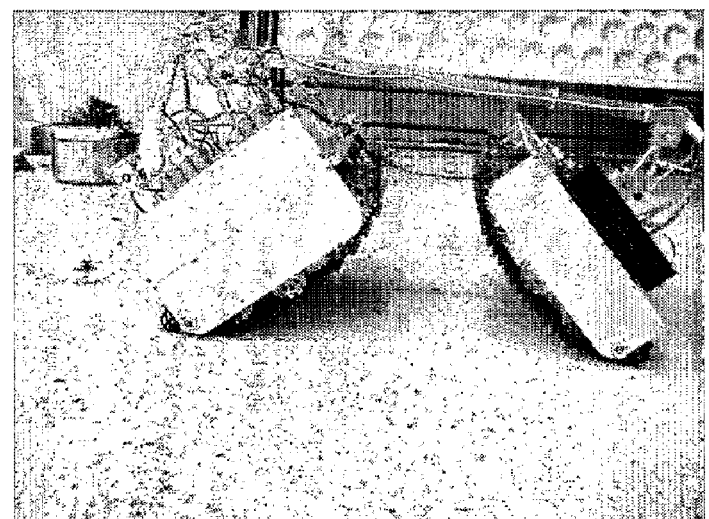

FIG. 10A and FIG. 10B show the extreme configuration of the mobile system called the V configuration and inverted V configuration respectively. These configurations are useful for reducing contact area with the ground (when needed), reducing slippage during turning, and increasing camera height (when needed). Especially the V configuration is most useful to traverse over relatively high obstacles.

Although embodiments of the invention have been described by way of illustration, it will be understood that the invention may be carried out with many variations, modifications, and adaptations. For example, skilled persons will be able to adapt the teachings herein to a robot system comprising three or more tracked driving systems connected in tandem by mechanical linkages described above. Also the system of the invention as described hereinabove is described as being autonomous in the sense that the system can move independently across the terrain, however skilled persons will be able to make a completely autonomous system that can move without human guidance by supplying additional sensors, such as cameras and GPS positioning system, and appropriate software.

BIBLIOGRAPHY

1. Althoefer K., Lara B., Seneviratne L. D., "Monitoring of Self-Tapping Screw Fastenings Using Artificial Neural Networks", Transactions of the ASME: Journal of Manufacturing Science and Engineering, Volume 127, Issue 1, pp. 236-243, February 2005
2. Shiller, Z., and Serate, W., "Trajectory Planning of Tracked Vehicles," *ASME Journal of Dynamic Systems, Measurement and Control*, December 1995, Vol. 117, No. 4, pp. 619-624
3. Tan C., Zweiri H. Y, Althoefer K., Seneviratne D. L.: "On-Line Soil Property Estimation for Autonmous Excavator Vehicles". ICRA 2003: pp. 121-126
4. Yoshida K., Hamano H., "Motion Dynamics of a Rover with Slip-Based Traction Model", International Conference on Robotics and Automation, 2002, pp. 3155-3160.

The invention claimed is:

1. An autonomous dual tracked mobile robot system comprising:
    two or more tracked driving units configured to travel in tandem and a separate mechanical linkage joining each of said tracked driving units to a unit immediately preceding and following each of said tracked driving units;
    wherein each of said mechanical linkages comprises:
        one connecting bar and three revolute joints on each of said units; and
        a connecting beam that connects said connecting bar on one of said units with said connecting bar on an adjacent unit;
    said mechanical linkage enabling efficient power force and moment transmission between said two driving units; and
    incremental encoders attached to each of said revolute joints, thereby allowing measurements of the relative configuration of components of said system.

2. An autonomous dual tracked mobile robot system, comprising:
    two or more tracked driving units configured to travel in tandem and a separate mechanical linkage joining each of said tracked driving units to a unit immediately preceding and following each of said tracked driving units;
    wherein each of said mechanical linkages comprises:
        one connecting bar and three revolute joints on each of said units; and
        a connecting beam that connects said connecting bar on one of said units with said connecting bar on an adjacent unit;
    said mechanical linkage enabling efficient power force and moment transmission between said two driving units,
    wherein one of the revolute joints on a first unit of said units connects a bottom of the connecting bar to a top of the first unit allowing unlimited revolution of said connecting bar around an axis perpendicular to an upper surface of said first unit and the other two of the revolute joints have limited motion bounded by a mechanical design of the revolute joints and adjustable by using two screws provided for this purpose on each of the revolute joints.

3. An autonomous dual tracked mobile robot system according to claim 1, wherein each of said units comprises a rechargeable power supply, which supplies energy to electric motors that drive tracks on said units and that drive other onboard equipment.

4. An autonomous dual tracked mobile robot system according to claim 1, wherein two-way communication with the autonomous robot system is by one or more of:
    wireless;
    an electric cable; and
    a fiber optic cable.

5. An autonomous dual tracked mobile robot system according to claim 4, comprising a winch system for transporting, releasing, and rewinding a cable mounted on one of the driving units.

6. An autonomous dual tracked mobile robot system, comprising:
two or more tracked driving units configured to travel in tandem and a separate mechanical linkage joining each of said tracked driving units to a unit immediately preceding and following each of said tracked driving units;
wherein each of said mechanical linkages comprises:
one connecting bar and three revolute joints on each of said units; and
a connecting beam that connects said connecting bar on one of said units with said connecting bar on an adjacent unit;
said mechanical linkage enabling efficient power force and moment transmission between said two driving units,
wherein the robot system is controlled by a synchronous motion controller that performs low level motor control of each track, said controller is connected to a higher level controller configured to synchronize two of said units according to data from the encoders.

7. An autonomous dual tracked mobile robot system according to claim 1, comprising a control system comprised of control software and a control screen viewed by an operator, said control system displaying one or more of the following:
various operation modes;
internal data;
an aerial photo of a robot area with an overlaying graph of the system's trajectory and current position;
video images from on-board cameras;
additional sensory data configured to be presented using special commands; and
a graphic window showing a three dimensional scheme of a relative position of two of said units.

8. An autonomous dual tracked mobile robot system according to claim 7, comprising two driving units and a dual joystick, which are configured to provide the operator with the following options to control said two driving units:
single mode;
twin mode;
follow mode 1; and
follow mode 2.

9. An autonomous dual tracked mobile robot system according to claim 1, wherein each driving unit can be equipped with one or more of the following:
on-board motion controller;
fiber-optics system;
camera;
lights; and
additional sensors of various types.

10. An autonomous dual tracked mobile robot system according to claim 1, wherein said robot system is completely autonomous traveling without one or more of an operator and a communication channel.

* * * * *

UNITED STATES PATENT AND TRADEMARK OFFICE
CERTIFICATE OF CORRECTION

PATENT NO.         : 7,946,372 B2                          Page 1 of 1
APPLICATION NO.    : 12/094358
DATED              : May 24, 2011
INVENTOR(S)        : Shraga et al.

It is certified that error appears in the above-identified patent and that said Letters Patent is hereby corrected as shown below:

Column 9
Line 12, "$12_i$" should read --$12_1$--.

Signed and Sealed this
First Day of May, 2012

David J. Kappos
*Director of the United States Patent and Trademark Office*

UNITED STATES PATENT AND TRADEMARK OFFICE
CERTIFICATE OF CORRECTION

PATENT NO. : 7,946,372 B2  
APPLICATION NO. : 12/094358  
DATED : May 24, 2011  
INVENTOR(S) : Shraga et al.

It is certified that error appears in the above-identified patent and that said Letters Patent is hereby corrected as shown below:

<u>On the Title Page</u>
Item (73) Assignee: "Ariel-University Research and Development Company, Ltd., Ariel (IL)" should read --Ariel-University Research and Development Company, Ltd., Ariel (IL); and Ben Gurion University of the Negev Research and Development Authority, Beer Sheva (IL)--.

Signed and Sealed this
Seventeenth Day of July, 2012

David J. Kappos
*Director of the United States Patent and Trademark Office*